US012759190B2

(12) United States Patent
Chatlani et al.

(10) Patent No.: US 12,759,190 B2
(45) **Date of Patent: *Oct. 13, 2026**

(54) EXTRUSION DIE PREPARATION METHODS

(71) Applicant: Corning Incorporated, Corning, NY (US)

(72) Inventors: Shyam Lekhraj Chatlani, Big Flats, NY (US); Ryan Joseph Grohsmeyer, Addison, NY (US); Christopher John Malarkey, Corning, NY (US); John Charles Rector, Beaver Dams, NY (US)

(73) Assignee: CORNING INCORPORATED, Corning, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 18/827,053

(22) Filed: Sep. 6, 2024

(65) Prior Publication Data

US 2024/0424711 A1 Dec. 26, 2024

Related U.S. Application Data

(62) Division of application No. 17/422,462, filed as application No. PCT/US2020/012845 on Jan. 9, 2020, now Pat. No. 12,151,397.

(Continued)

(51) Int. Cl.
*B28B 3/26* (2006.01)

(52) U.S. Cl.
CPC .... *B28B 3/269* (2013.01); *B29C 2948/92495* (2019.02)

(58) Field of Classification Search
CPC ...................... B28B 3/269; B29C 2948/92495

(Continued)

(56) References Cited

U.S. PATENT DOCUMENTS 5,070,588 A 12/1991 Miwa et al.
5,171,503 A 12/1992 Peters et al.

(Continued)

FOREIGN PATENT DOCUMENTS

CN 1376108 A 10/2002
CN 1592674 A 3/2005

(Continued)

OTHER PUBLICATIONS

Chinese Patent Application No. 202080011827.6, Office Action dated Sep. 30, 2022, 4 pages (English translation only), Chinese Patent Office.

(Continued)

*Primary Examiner* — Christina A Johnson
*Assistant Examiner* — Xue H Liu
(74) *Attorney, Agent, or Firm* — Kevin M. Able

(57) ABSTRACT

Methods for extruding a ceramic-forming mixture through a honeycomb extrusion die, methods for forming a green honeycomb extrudate from a ceramic-forming mixture, methods of preparation of a honeycomb extrusion die that extrudes a ceramic-forming mixture, and systems including a honeycomb extrusion die, ceramic-forming mixture, and abrasive flow media. The method of extruding a ceramic-forming mixture through a honeycomb extrusion die includes conditioning the honeycomb extrusion die by extruding an abrasive flow media through the slots of the die prior to extruding the ceramic-forming mixture through the slots of the die. The abrasive flow media includes abrasive inorganic particles dispersed in a flowable carrier. The ceramic-forming mixture includes one or more types of inorganic ceramic-forming particles. The abrasive inorganic particles in the flowable carrier have a particle size distribution that corresponds to that of at least one type of the ceramic-forming particles in the ceramic-forming mixture.

20 Claims, 3 Drawing Sheets

Related U.S. Application Data

(60) Provisional application No. 62/798,534, filed on Jan. 30, 2019.

(58) Field of Classification Search
USPC .................................................... 264/177.12
See application file for complete search history.

(56) References Cited

U.S. PATENT DOCUMENTS

| | | | | |
|---|---|---|---|---|
| 6,299,813 | B1 | 10/2001 | Brew et al. | |
| 7,094,047 | B2 | 8/2006 | Yamada et al. | |
| 7,976,768 | B2 | 7/2011 | Brady et al. | |
| 8,257,623 | B2 | 9/2012 | Rector et al. | |
| 9,796,108 | B2 | 10/2017 | Vaidyanathan | |
| 10,603,814 | B2 | 3/2020 | Atkins et al. | |
| 11,045,975 | B2 | 6/2021 | Allard et al. | |
| 11,752,679 | B2 * | 9/2023 | Brew | B29C 48/11 264/630 |
| 2005/0031727 | A1 | 2/2005 | Matsuoka et al. | |
| 2008/0138644 | A1 | 6/2008 | Abbott et al. | |
| 2011/0049743 | A1 | 3/2011 | Rector et al. | |
| 2019/0099916 | A1 | 4/2019 | Bubb et al. | |
| 2020/0262103 | A1 | 8/2020 | Brew et al. | |

FOREIGN PATENT DOCUMENTS

| | | | |
|---|---|---|---|
| CN | 1832820 | A | 9/2006 |
| CN | 104781056 | A | 7/2015 |
| CN | 107206625 | A | 9/2017 |
| CN | 107597871 | A | 1/2018 |
| CN | 108349110 | A | 7/2018 |
| CN | 108698252 | A | 10/2018 |
| EP | 0389253 | A2 | 9/1990 |
| JP | 2003-181819 | A | 7/2003 |
| JP | 2003-251619 | A | 9/2003 |
| JP | 2007-237707 | A | 9/2007 |
| JP | 4091763 | B2 | 5/2008 |

OTHER PUBLICATIONS

CN107597871 Machine Translation, 2023.

CN108698252 Machine Translation, 2023.

International Search Report and Written Opinion of the International Searching Authority; PCT/US2020/012845 Mailed on May 12, 2020, 11 pages; European Patent Office.

* cited by examiner

EXTRUSION DIE PREPARATION METHODS

This application is a divisional application of U.S. application Ser. No. 17/422,462, filed on Jul. 13, 2021, which is a National Stage application under 35 U.S.C. § 371 of International Application No. PCT/US2020/012845, filed on Jan. 9, 2020, which claims the benefit of priority under 35 U.S.C. § 119 of U.S. Provisional Application No. 62/798,534 filed on Jan. 30, 2019, the content of which is incorporated herein by reference in their entireties.

FIELD

The present specification relates generally to forming of green honeycomb extrudates. More particularly, methods pertain to formation of green honeycomb extrudates from ceramic-forming mixtures extruded through cellular or honeycomb extrusion dies, and abrasive flow media and processes of preparation of the cellular or honeycomb extrusion dies.

BACKGROUND

Green honeycomb extrudates can be made by extrusion of a ceramic-forming mixture through a die, for example a honeycomb or cellular extrusion die. Green honeycomb extrudates can then be dried and fired to form durable honeycomb bodies, which are suitable for various uses including use as catalyst carriers and porous filters for the control of exhaust emissions from internal combustion engines. There is a need for cost-effective extrusion die break-in methods and materials for the same.

SUMMARY

According to some embodiments, a method of extruding a ceramic-forming mixture through a honeycomb extrusion die that comprises a plurality of pins defining a plurality of slots is provided. The method comprises conditioning the honeycomb extrusion die by extruding an abrasive flow media through the slots of the die prior to extruding the ceramic-forming mixture through the slots of the die; wherein the abrasive flow media comprises abrasive inorganic particles dispersed in a flowable carrier; wherein the ceramic-forming mixture comprises one or more types of inorganic ceramic-forming particles; and wherein the abrasive inorganic particles in the flowable carrier have a particle size distribution that corresponds to that of at least one type of the ceramic-forming particles in the ceramic-forming mixture.

In some embodiments, the at least one type of abrasive inorganic particles and the at least one type of ceramic-forming particles have a common composition.

In some embodiments, the abrasive inorganic particles are at least as hard as a hardest of the ceramic-forming particles in the ceramic-forming mixture.

In some embodiments, the abrasive inorganic particles are at least as abrasive as a most abrasive of the ceramic-forming particles in the ceramic-forming mixture.

In some embodiments, the particle size distribution of the abrasive inorganic particles corresponds to a combination of a first particle size distribution of a first type of the ceramic-forming particles and a second particle size distribution of a second type of the ceramic-forming particles.

In some embodiments, the abrasive inorganic particles and the at least one type of ceramic-forming particles have a common hardness value.

In some embodiments, the particle size distribution of the abrasive inorganic particles has a peak in volume percentage at a particle diameter that corresponds to a most frequently occurring particle diameter of the at least one type of ceramic-forming particles.

In some embodiments, the peak of the particle size distribution of the abrasive inorganic particles has a local maxima in volume percentage at a particle diameter that is within a range of 20% of the most frequently occurring particle size of the at least one type of ceramic-forming particles.

In some embodiments, the particle size distribution of the abrasive inorganic particles has a first peak in volume percentage at a first particle diameter that corresponds to a most frequently occurring particle diameter of the at least one type of abrasive inorganic particles, and a second peak in volume percentage at a second particle diameter that corresponds to a second most frequently occurring particle diameter of the at least one type of abrasive inorganic particles.

In some embodiments, the first peak of the particle size distribution of the abrasive inorganic particles has a first local maxima in particle diameter that is within a range of 20% of the most frequently occurring particle diameter of the at least one type of ceramic-forming particles and the second peak of the particle diameter distribution of the abrasive inorganic particles has a second local maxima in particle size that is within a range of 20% of the most frequently occurring particle diameter of the at least one type of ceramic-forming particles.

In some embodiments, the at least one type of abrasive inorganic particle comprises more than one type of abrasive inorganic particle; wherein the at least one type of ceramic-forming particles comprises more than one type of inorganic ceramic-forming particles; and wherein the more than one type of abrasive inorganic particles has one or more abrasion characteristics in common with the more than one type of inorganic ceramic-forming particles.

In some embodiments, the at least one type of inorganic ceramic-forming particles comprises first abrasive particles having a first particle size distribution that comprises a first peak in a volume percentage of the first abrasive particles at a first particle diameter, wherein the at least one type of abrasive inorganic particles comprises second abrasive particles comprising a second particle size distribution that comprises a second peak in a volume percentage of the second particles at a second particle size of the second abrasive particles, wherein the second particle diameter is within a range of about 20% greater or smaller than the first particle diameter.

In some embodiments, the first abrasive particles comprise one or more of a hardest, a second hardest, and a third hardest component in the ceramic-forming mixture.

In some embodiments, the second abrasive particles are at least as hard as the first abrasive particles.

In some embodiments, the second abrasive particles are at least as hard as outer surfaces of the honeycomb extrusion die.

In some embodiments, the second particle diameter is within about 10% of the first particle diameter.

In some embodiments, the second particle diameter is within about 5% of the first particle diameter.

In some embodiments, the volume percentage of the second abrasive particle at the second peak of the second particle size distribution is within about 20% of the volume percentage of the first abrasive particle at the first peak of the first particle size distribution.

In some embodiments, the volume percentage of the second abrasive particle at the second peak of the second particle size distribution is within about 10% of the volume percentage of the first abrasive particle at the first peak of the first particle size distribution.

In some embodiments, the volume percentage of the second abrasive particle at the second peak of the second particle size distribution is within about 5% of the volume percentage of the first abrasive particle at the first peak of the first particle size distribution.

In some embodiments, the first particle size distribution is a polymodal distribution comprising the first peak and a third peak corresponding to a third particle size.

In some embodiments, the second particle size distribution is a polymodal distribution comprising the second peak and fourth peak at a fourth particle size, wherein the fourth particle size is within 20% of the third particle size.

In some embodiments, the second particle size distribution has less peaks than the first particle size distribution.

In some embodiments, the first particle size of the first peak is a largest particle size that corresponds to any of the peaks of the polymodal distribution.

In some embodiments, the volume percentage of the first peak is a largest volume percentage of any peaks of the polymodal distribution.

According to some embodiments, a method of preparation of a honeycomb extrusion die that extrudes a ceramic-forming mixture into a green honeycomb extrudate is provided. The method comprises identifying one or more components of ceramic-forming particles in the ceramic-forming mixture that have an abrasive effect on the honeycomb extrusion die during extrusion; designing an abrasive flow media as a combination of abrasive grit particles in a flowable carrier such that the abrasive grit particles have a first particle size distribution that has at least one peak in volume percentage at a particle diameter that corresponds to a second particle size distribution of the ceramic-forming particles in the ceramic-forming mixture; and exposing unconditioned surfaces of the honeycomb extrusion die to the abrasive flow media to condition the surfaces of the honeycomb extrusion die.

In some embodiments, the designing of the abrasive flow media comprises: determining a smallest aperture of the honeycomb extrusion die; obtaining the abrasive grit particles comprising: the one or more components of the ceramic-forming mixture identified as having the abrasive effect or a component not present in the ceramic-forming mixture that is at least as abrasive as the one or more components of the ceramic-forming mixture; and a maximum particle size that is less than or equal to 80% of the smallest opening of the honeycomb extrusion die; and mixing the abrasive grit particles with the carrier to form the abrasive flow media having a volumetric solids loading that is less than or equal to the volumetric solids loading of the ceramic-forming mixture.

In some embodiments, the method further comprises adjusting rheological flow characteristics of the abrasive flow media to match those of the ceramic-forming mixture.

In some embodiments, the method further comprises analyzing a broken-in surface of a comparable honeycomb extrusion die that extruded the ceramic-forming mixture to establish a target surface pattern, and adjusting at least one of a material of the abrasive grit particles, particle size distribution of the abrasive grit particles, and rheological flow characteristics of the abrasive flow media to minimize differences between the target surface pattern and a wear pattern in the honeycomb extrusion die caused by the abrasive flow media.

In some embodiments, the abrasive grit particles comprise a same composition as the one or more components of the ceramic-forming mixture.

In some embodiments, the abrasive grit particles have a hardness that is greater than or equal to a highest or second highest hardness of the one or more components of the ceramic-forming mixture.

In some embodiments, an overall volume weighted particle size distribution of the abrasive grit particles is substantially the same as an overall volume weighted particle size distribution of a hardest component or a second hardest component of the ceramic-forming mixture.

In some embodiments, the abrasive flow media has a rheological flow that is substantially the same as the ceramic-forming mixture.

In some embodiments, the abrasive grit particles have a maximum d99 particle diameter that is less than or equal to 80% of a smallest aperture dimension in the die.

In some embodiments, the unconditioned surfaces of the honeycomb extrusion die are uncoated surfaces, and the abrasive flow media is exposed to the uncoated surfaces for a duration that is effective: to change geometry of the uncoated surfaces, to deburr the uncoated surfaces, or combinations thereof.

In some embodiments, the method further comprises coating the uncoated surfaces after the duration to form coated surfaces, and subsequently exposing the abrasive flow media to the coated surfaces for a duration that is effective: to smooth the coated surfaces, to create flow grooves in the coated surfaces, or combinations thereof.

In some embodiments, the unconditioned surfaces of the honeycomb extrusion die are coated surfaces, and the abrasive flow media is exposed to the coated surfaces for a duration that is effective: to smooth the coated surfaces, to create flow grooves in the coated surfaces, or combinations thereof.

In some embodiments, the coated surfaces of the honeycomb extrusion die comprise a coating of titanium carbonitride or of boron-doped titanium carbonitride.

In some embodiments, exposing the unconditioned surfaces of the honeycomb extrusion die to the abrasive flow media is conducted in equipment off-line from a manufacturing extrusion line.

In some embodiments, the abrasive grit particles comprise alumina, quartz, or combinations thereof.

In some embodiments, the flowable carrier comprises a silicone- or polyorganosiloxane-based polymer.

According to some embodiments, a system comprises an abrasive flow media, a ceramic-forming mixture comprising at least one type of ceramic-forming particles, and a honeycomb extrusion die having one or more exposed surfaces, wherein the abrasive flow media comprises at least one type of abrasive inorganic particles dispersed in a flowable carrier, and wherein the at least one type of abrasive inorganic particles have a particle size distribution that corresponds to that of the at least one type of the ceramic-forming particles in the ceramic-forming mixture.

In some embodiments, the abrasive inorganic particles have an overall volume weighted particle size distribution that is substantially the same as an overall volume weighted particle size distribution of one or more components of the ceramic-forming mixture having a measurable abrasive effect.

In some embodiments, the abrasive flow media comprises a maximum d99 particle diameter that is less than or equal to 80% of a smallest aperture dimension in the die.

In some embodiments, the abrasive grit particles have a hardness that is greater than or equal to the highest or second highest hardness component of the ceramic-forming mixture; an overall volume weighted particle size distribution of the abrasive grit particles is substantially the same as an overall volume weighted particle size distribution of the highest and second highest hardness components of the ceramic-forming mixture; the abrasive flow media has a rheological flow that is substantially the same as the ceramic-forming mixture; and the abrasive flow media comprises a maximum d99 particle diameter that is less than or equal to 80% of a smallest aperture dimension in the die.

In some embodiments, the abrasive grit particles are present in an overall bimodal particle size distribution that comprises particles of a first mean particle diameter effective for polishing and particles of a second mean particle diameter effective for grinding.

In some embodiments, the flowable carrier comprises a silicone- or polyorganosiloxane-based polymer.

In some embodiments, the exposed surfaces of the die comprise a coating of titanium carbonitride or boron-doped titanium carbonitride.

Additional features and advantages will be set forth in the detailed description, which follows, and in part will be readily apparent to those skilled in the art from that description or recognized by practicing the embodiments described herein, comprising the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
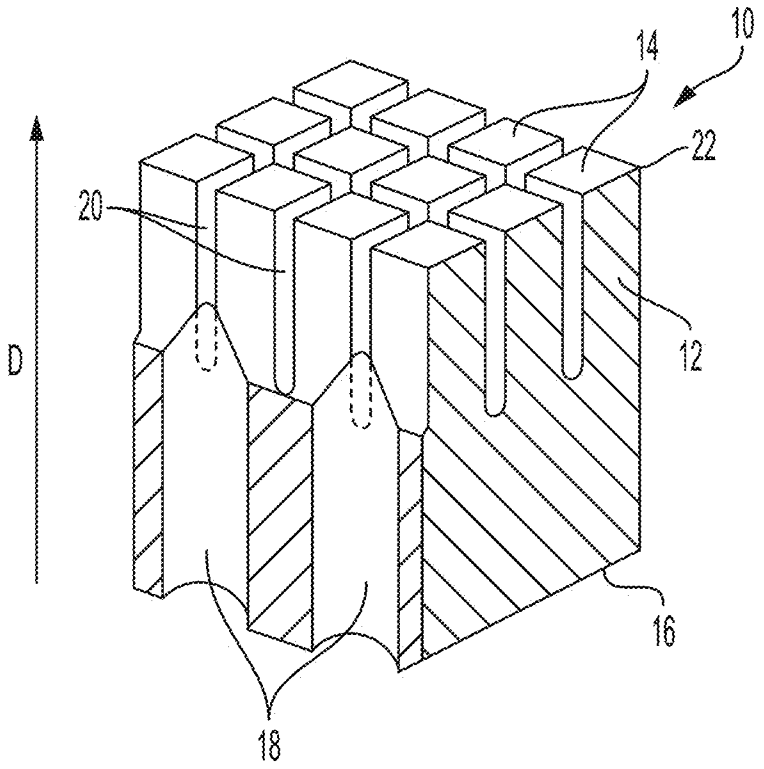
FIG. 1 schematically depicts an exemplary honeycomb extrusion die.

Abrasive flow media (AFM) according to embodiments disclosed herein comprise a combination of abrasive grit particles and a flowable carrier. The AFM is used to condition the surfaces of honeycomb or cellular extrusion dies, in preparation of the formation of green honeycomb extrudates from the dies. The extrudates are further processed (e.g., dried and fired) to make ceramic honeycomb bodies. Such ceramic honeycomb bodies can be used in a variety of applications, such as catalyst carriers and porous filters for the control of exhaust emissions from internal combustion engines.

The ceramic-forming mixtures as referred to herein can include any mixture of organic and inorganic components that can be used to form a ceramic honeycomb body, e.g., by extrusion, drying, firing, etc. In particular, a ceramic-forming mixture has one or more types of abrasive particles (e.g., inorganic ceramic-forming particles) that have corresponding rheological and abrasive characteristics. The AFM according to the embodiments disclosed herein is designed to impart desired wear patterns (e.g., surface roughness, groove-like flow paths, etc.) on the surfaces of honeycomb extrusion dies, e.g., which resemble, replicate, or simulate (these terms used interchangeably) the flow and/or abrasive characteristics of one or more types of abrasive particles of the ceramic-forming mixture. In some one embodiments, the abrasive particles of the ceramic-forming mixture comprises inorganic ceramic-forming particles (e.g., ceramic particles or particles that form ceramics when subjected to appropriate manufacturing steps such as firing). In general terms, the AFM is designed to have a similar abrasive pattern and/or flow behavior to that of one or more types of abrasive particle (e.g., inorganic ceramic-forming particles) of the ceramic-forming mixture that is intended to be extruded through the honeycomb extrusion die to form a green ceramic extrudate after the surfaces of the die are conditioned by the AFM.

According to some embodiments, the abrasive particles of the AFM are arranged so as to reduce the amount of time required to break-in the die compared to the amount of time that it would take the ceramic-forming mixture to break-in the die. That is, the AFM is arranged to not only simulate the flow characteristics and/or make-up of the ceramic-forming mixture (as discussed in more detail herein), but in some embodiments, can also have an enhanced abrasive character (e.g., greater hardness) relative to the ceramic-forming mixture so that break-in of the die can be achieved in less time than would be needed by using the particular ceramic-forming mixture.

For example, characteristics such as particle hardness, particle size distribution (PSD), and maximum particle size of the abrasive grit particles in the abrasive flow media, as well as flow rheology, are chosen in order to impart a desired surface finish and flow pathway geometry through the apertures in the die (e.g., slots formed between adjacent pins of the die). By designing the abrasive flow media to have an engineered combination of abrasive grit particles in a flowable carrier (e.g., a polymeric carrier), which simulates one or more properties of the ceramic-forming mixtures, break-in time can be decreased and/or more efficiently performed before the die is subjected to the ceramic-forming mixture.

Preparation of honeycomb extrusion dies according to the methods herein can be done during die manufacture, such as off-line from a manufacturing extrusion line, which avoids costly downtime during production. The AFM according to the embodiments disclosed herein is designed to achieve substantially the same conditioned surfaces and/or to simulate one or more abrasive characteristics of the ceramic-forming mixture. For example, the AFM can be used to smooth of the surface roughness and generate similar groove-like flow pathways at similar angles and orientations on the pin faces. Additionally, according to some embodiments disclosed herein, the AFM can achieve its function in a relatively smaller number of linear feet flowed through the die as compared to the number of linear feet of the ceramic-forming mixture that is often needed to break-in dies online (e.g., up to several thousand or tens of thousands of linear feet, depending on the particular ceramic-forming mixture used). In one or more embodiments, characteristics of the AFM correspond to those of the ceramic-forming mixture in terms of maximum particle size and particle size distribution of the abrasive grit, and rheological flow characteristics. In some embodiments, the AFM is more abrasive (e.g., has a greater hardness) than the ceramic-forming mixture.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open-ended sense, and generally mean "including, but not limited to".

A honeycomb body, as referred to herein, is a shaped ceramic honeycomb structure of intersecting walls to form cells the define channels (e.g., axially or longitudinally) through the honeycomb structure. The ceramic honeycomb body and the cells can be of any shape or size (e.g., a generally circular shaped honeycomb body comprising a plurality of square-shaped cells). Other shapes for the honeycomb body, honeycomb structure, and/or honeycomb cells include triangles, polygons, ovals, wedges, etc. A ceramic honeycomb structure is formed from a ceramic-forming mixture, which can comprise, or be used to form, cordierite, aluminum titanate, or other ceramic materials or combinations of ceramic materials.

Reference to "abrasive effect" as used herein means an amount of surface modification imparted to a surface of an extrusion die by a given component, material, ingredient, or combination thereof. As discussed herein, the abrasive effect of a component, material, or ingredient can be determined experimentally, e.g., by measuring the wear rate resulting from exposure of a surface to the abrasive component, material, and/or ingredient. Since abrasiveness largely correlates to the hardness of the abrasive particle, the hardness of one or more types of particle can be utilized as an analog or proxy for estimating the relative abrasiveness of various particles, with harder materials being generally considered to be more abrasive than less hard materials. Hardness can be determined by any scientifically recognized hardness scale, such as Mohs, Vickers, Rockwell, Brinell, etc. In general, a particle is considered herein to be an abrasive particle that has an abrasive effect when the particle is capable of creating non-elastic dislocations in a surface of the extrusion die. Thus, it is to be appreciated that the abrasive effect of any given particle is relative to the material of the surface with respect to which the particle is attempting to abrade. According to some embodiments herein, any particle made from a material at least about as hard as silica can be considered an abrasive particle. In some embodiments, any abrasive particles can be considered as any particle having a hardness of at least about 6-7 on the Mohs hardness scale and/or a hardness of at least about 750-1000 on the Vickers hardness scale. In some embodiments, the abrasive particles of the ceramic-forming mixture, the abrasive flow media, or both, comprises abrasive inorganic particles. In some embodiments, inorganic ceramic-forming particles As an example, an abrasive flow media having a greater abrasive effect than a ceramic-forming mixture means that the abrasive flow media has a higher wear rate as compared to the ceramic-forming mixture (e.g., achieves a desired dimensional change and/or surface pattern (e.g., surface roughness) in less time and/or utilizing less linear feet of material than the ceramic-forming mixture). Dimensional changes and/or surface patterns achievable by abrasive particles can include surface smoothing, edge rounding, deburring, and flow groove creation. These results can be measured by a surface finish analyzer known to those skilled in the art. For example, surface roughness, which is an indication of surface smoothing, can be measured by white light interferometry noncontact techniques using a profilometer system from a supplier such as ZYGO. Surface roughness can be measured by, for example, a stylus contact technique using a perthometer by MAHR. In one or more embodiments, reference to significant or detectable abrasive effect means that there is a noticeable or preferably measureable effect on a surface by a component for a given solids loading, for example smoothing.

Reference to "target surface pattern" as used herein means characteristics including but not limited to surface roughness and/or flow grooves of a broken-in surface of a die that has exhibited acceptable flow under production conditions. A target surface pattern may exist on any part of broken-in surfaces of a honeycomb extrusion die; different parts of a honeycomb extrusion die may exhibit different target surface patterns.

"Conditioned" surfaces are those surfaces of a die that have been exposed to abrasive particles, such as in an abrasive flow media or ceramic-forming mixture. Unconditioned surfaces of the die are present during fabrication of the die (e.g., immediately after a surface is milled or coated). Conditioning of the surfaces of a die with an abrasive flow media can be considered fully completed when the abrasive flow media has worn the surfaces to achieve steady state flow pressure over the surfaces and/or to achieve a wear pattern that has acceptable differences to a target surface pattern.

According to embodiments disclosed herein, a particle size distribution (PSD) of the abrasive particles of an abrasive flow media has one or more peaks that are within a ±30%, or more preferably less than a ±20% difference from the peak(s) of the PSD of one or more abrasive particles of a ceramic-forming mixture. For example, if a peak in the PSD of one type of ceramic-forming particles (e.g., alumina, silica, etc.) in a ceramic-forming mixture occurs at a particle size of 1 μm, then the PSD of the abrasive particles in the abrasive flow media according to embodiments herein is set to have a corresponding peak, e.g., a peak that is in the range of 0.8 μm to 1.2 μm particle size, which is within ±20% of the peak at the particle size of 1 μm for the ceramic-forming particles. The particle size distribution of the abrasive particles of the abrasive flow media can also have a d90 or d99 that is within ±30%, or even more preferably, a ±20% difference respectively for the d90 or d99 of the PSD of the particles of the ceramic-forming mixture. The difference with respect to the peaks of the PSD can be determined with respect to the particle size corresponding to a peak, the value of the volume percentage at the peak, or a combination of both. As discussed herein, the comparison of peaks can be performed mathematically by evaluating local maxima in the PSD data for the abrasive particles of the ceramic-forming mixture and the AFM. As used herein with respect to PSD or maximum d99 particle size, "substantially the same" refers to the aforementioned ±20% difference, or even more preferably less than a 10% difference, or even less than a 5% difference.

As used herein, "substantially the same" with respect to rheological flow characteristics ceramic-forming mixture can be experimentally determined by inspecting the results of running the abrasive flow media through a die or dielet, i.e., by comparing the surface pattern resulting from the abrasive flow media to a target surface pattern corresponding to the intended ceramic-forming mixture being run through a comparable die or dielet.

Honeycomb extrusion dies are characterized by complex internal geometries formed by various parts. As schematically shown in FIG. 1, an exemplary honeycomb extrusion die 10 comprises a die body 12 having a discharge face 22 comprising pins 14 at an downstream end of the die with respect to an extrusion direction D through the die, and an inlet face 16 at an upstream end of the die with respect to the extrusion direction D. An array of feedholes 18 extending into die body 12 from inlet face 16 connects with an array of crisscrossing discharge slots 20 extending toward and opening onto discharge face 22 of the die. A ceramic-forming mixture (not shown) introduced into the feedholes can be conveyed through and extruded from the slots in the form of a green honeycomb extrudate, which is then dried and fired to form a honeycomb body for various uses. Ceramic-forming mixtures contain particles of varying morphologies, including hardness, fracture patterns, average particle size, particle size distribution, and the like. At least some components of the ceramic-forming mixture are abrasive (e.g., having a hardness comparable to the hardness of the surfaces of the die), subjecting surfaces of the die to wear. Because of this, surfaces of parts of the dies, for example, pins, feedholes, and discharge slots, can be coated to increase wear resistance. For example, many ceramic-forming mixtures comprise ceramic-forming components such as silica and/or alumina, either of which will have an abrasive effect on even very hard, wear-resistant coatings such as doped or undoped carbides and nitrides, as discussed herein.

The inventors have found that during start-up of a manufacturing extrusion line, honeycomb extrusion dies can exhibit pressures for the extrusion line that are greater than an expected or acceptable operating pressure. Also dies can have areas that do not receive an intended volumetric flowrate in comparison to other areas (e.g., too much or too little flow). Extensive break-in time may be needed with ceramic batch on a production line until pressure decreases to an acceptable level and extrusion velocity or flowrate stabilizes. Break-in of new dies reduces time and capacity available for production, and wastes ceramic batch that could otherwise be used to produce viable parts. In some cases, the inventors have found that break-in can require even several hours on an extrusion line and can be costly in terms of time and materials. During break-in, surfaces of the die (e.g., uncoated or formed by any coatings applied to the die during manufacture) are worn and/or abraded by the ceramic batch material. Decreased surface roughness and fine flow grooves in the surfaces can form surface patterns that correspond to preferred flow pathways of the ceramic batch. After the break-in process, extrusion dies are ready to run in a consistent manner on future production runs (e.g., as noted above, pressures, velocities, flowrates, and/or other extrusion parameters are stabilized).

This disclosure provides an efficient and in some cases lower cost way to prepare a die for its first production run and subsequent production runs.

In an embodiment, the honeycomb extrusion die comprises a die body. The die body can be any material known in the art that is used to make tool dies such as honeycomb extrusion dies. The die body material can, for example, include metals, alloys, composite materials, or the like. In an embodiment, the die body material is tool steel or a stainless steel such as, but not limited to, 422 and 450 stainless steels. Additional coatings, e.g., containing metals or alloys, such as nickel, nickel based alloys, molybdenum, molybdenum alloys, titanium, titanium alloys, tungsten, tungsten alloys, or the like, can be applied to the die body material.

In an embodiment, one or more surfaces of the honeycomb extrusion die body comprise a wear resistant coating, e.g., which enhances durability and lifespan of the die. The wear resistant coating can comprise at least one of: an inorganic carbide, an inorganic nitride, or combinations thereof. Such combinations include, but are not limited to, single phase materials, such as carbonitrides, and multiphase combinations of carbides and nitrides. Non-limiting examples of such carbides and nitrides include titanium carbides (TIC), tungsten carbides ($W_3C$, WC, $W_2C$), molybdenum carbides ($Mo_xC_y$), titanium nitrides (TiN), and titanium carbonitrides ($TiC_xN_{1-x}$, where $0.35<x<0.65$). Such materials may have either stoichiometric or non-stoichiometric (e.g., substoichiometric) compositions. The wear resistant coating can further comprise at least one dopant. Such dopants include, but are not limited to, boron, carbon monoxide, aluminum, sulfur, and the like. Surface roughness of a $TiC_xN_{1-x}$ coating can be reduced by a factor of 2 and, in some embodiments, by a factor of 10, by introducing boron as a dopant.

Coatings can be applied to the die substrate by any known process, such as a chemical vapor deposition (CVD) process. The conditions at which the CVD process is carried out dictate the surface morphology of the wear resistant coating. Titanium carbonitride ($TiC_xN_{1-x}$) coatings, for example, are grown at temperatures ranging from about 800° C. to 850° C. These coatings tend to grow in a columnar fashion, which produces a faceted morphology on the free or outer surface of the coating.

Upon fabrication of a honeycomb extrusion die, surfaces of the die are in an unconditioned form. During conditioning of the honeycomb extrusion die, also known as break-in or preparation, the surfaces of the die are worn and/or abraded resulting in, for example, decreased surface roughness and fine flow grooves that correspond to preferred flow pathways. The surfaces of a die can undergo multiple subsequent conditioning processes during break-in.

Figure 2B:
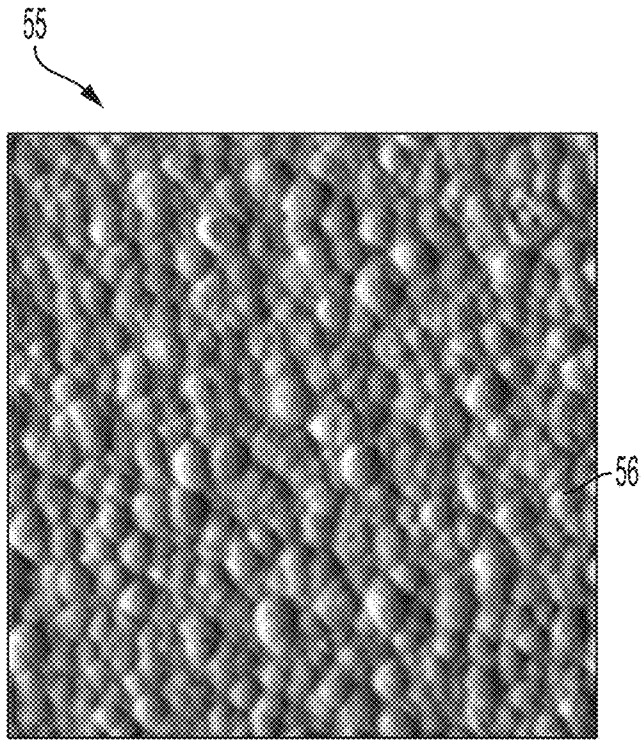
FIG. 2B shows an enlargement of a portion of FIG. 2A.
Figure 2A:
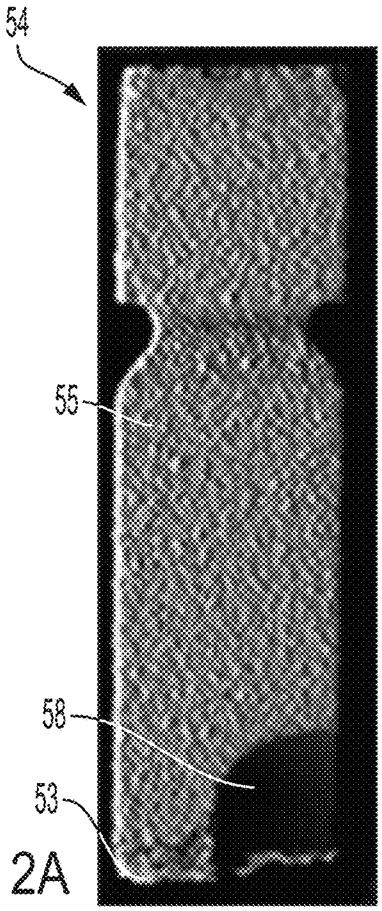
FIG. 2A shows a scanning electron microscope (SEM) image of side view of an exemplary pin of a honeycomb extrusion die having an unconditioned surface.

FIG. 2A shows a scanning electron microscope (SEM) image of a side view of an exemplary pin 54 of a honeycomb extrusion die having an unconditioned surface 55, which comprises a titanium carbonitride wear resistant coating. The pin 54 has a portion of a feedhole 58 formed therein near a pin root 53. FIG. 2B shows an enlargement of a portion of FIG. 2A, where the unconditioned surface 55 of the pin displays a roughness 56 and no flow grooves.

Figure 3A:
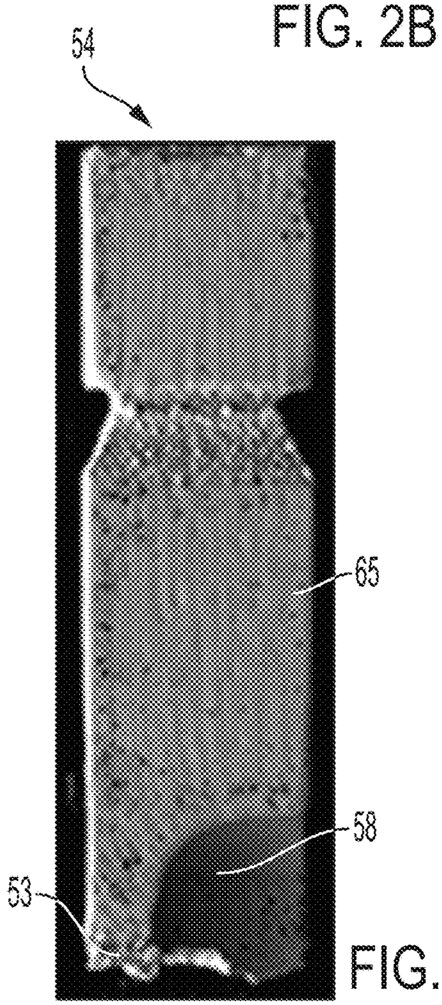
FIG. 3A shows a scanning electron microscope (SEM) image of side view of an exemplary pin of a honeycomb extrusion die having a conditioned surface.
Figure 3B:
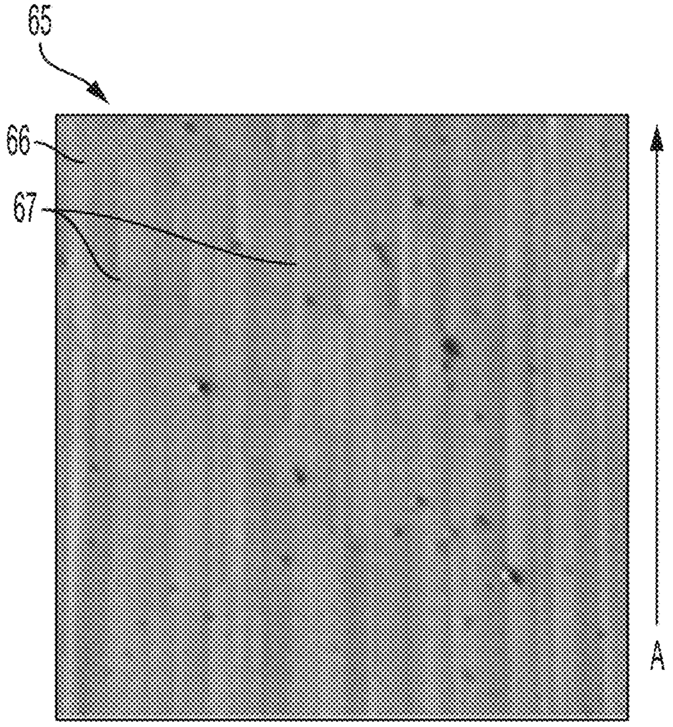
FIG. 3B shows an enlargement of a portion of FIG. 3A.

FIG. 3A shows a scanning electron microscope (SEM) image of a side view of the exemplary pin 54 of a honeycomb extrusion die having a conditioned surface 65 after exposure to 21,000 linear feet of a ceramic-forming mixture. FIG. 3B shows an enlargement of a portion of FIG. 3A, where the conditioned surface 65 of the pin displays a morphology of decreased roughness 66 and flow grooves 67, where the flow grooves 67 are in the direction of and substantially parallel to line "A". FIGS. 3A-3B represent an exemplary target surface pattern for a particular ceramic-forming mixture. The change in surface roughness of the pin 54 between FIGS. 2A-2B and 3A-3B is due to abrasion by abrasive particles in the ceramic-forming mixture, with abraded grooving being visible both parallel to the long axis of the pin 54 and radiating from the curved edge of the feedhole 58 near the pin root 53.

When dies arrive to an extrusion manufacturing plant with surfaces that are unconditioned (e.g., having a high surface roughness and/or no flow grooves as shown in FIGS. 2A-2B), the dies will be broken-in on the extrusion line as the surfaces of the dies are exposed to the ceramic-forming mixture, requiring large amounts of time and ceramic-forming mixture to produce the conditioned surface shown in FIGS. 3A-3B.

By creating an abrasive flow media (AFM) that simulates a particular ceramic-forming mixture with respect to rheology and/or abrasive effect to create a target surface pattern, several advantages are realized. For example, conditioning or break-in of a honeycomb extrusion die can be included in the fabrication process off-line from an extrusion line using abrasive flow machining equipment before the dies are installed on the extrusion line. This in turn can lead to cost reductions based on costs associated with die break-in on the extrusion lines. For example, a single operator is needed to operate a single piece of abrasive flow machining equipment using the AFM, instead of a team of operators needed to run an extrusion line with associated dry blend operations, building overhead, and the like. In embodiments disclosed herein, raw materials usage can be reduced and waste is reduced because the AFM is re-usable on multiple dies whereas many ceramic-forming batch materials are one-time use and wasted when used for die break-in. Extrusion line production capacity can increase because the break-in occurs prior to the die being installed on the extrusion line, e.g., concurrently with a different die being used to extrude parts on the extrusion line. Use of ceramic-forming mixtures for break-in on the extrusion line according to current practice can be slow and inefficient due to the ceramic-forming mixtures being relatively soft (e.g., with alumina or a similar material being the hardest material in the ceramic-forming mixture). Using the AFM with a greater abrasive effect or wear rate (e.g., the AFM comprising an abrasive grit having a hardness at least as hard as the hardest particle in the ceramic-forming mixture, if not at least as hard as the hardness of the surface of the die) can make break-in faster, thereby reducing the overall time required to break-in dies. By moving die break-in off of the extrusion lines, significantly more line time will be available for making production parts. Another advantage is that conditioned surfaces of the honeycomb extrusion die will be more closely tailored to batch characteristics before any ceramic-forming mixture is introduced.

The abrasive flow media and methods of use disclosed herein are suitable for combinations of honeycomb extrusion dies and ceramic-forming mixtures. Ceramic-forming mixtures typically have a combination of types of particles having varying hardnesses and wear characteristics. For a combination of surfaces of honeycomb extrusion dies and ceramic-forming mixtures, an abrasive flow media according to some embodiments comprises those components of the ceramic-forming mixture that significantly or detectably or measurably contribute to wear of the die surfaces. For example, the AFM in some embodiments include the components of a ceramic-forming mixture that are capable of creating non-elastic dislocations in the surfaces of the die. The ability to wear a die surface (e.g., raw metal or a coating) depends on the composition of the material of the die surface. The components that significantly, detectably, or measurably contribute to wear of the die surfaces may be all ingredients of the ceramic-forming mixture, or a subset of the ingredients. In some embodiments, the AFM comprises abrasive particles at least as hard as the abrasive particles in the ceramic-forming mixture, e.g., the same material as noted above, or a different material. In some embodiments, the AFM comprises abrasive particles at least as hard as the hardness of the material of the surface of the die, e.g., the same material or a different material.

Varying hardnesses of ceramic-forming mixtures can include components having a relatively high hardness, e.g., a hardness of greater than or equal to 6-7 on the Mohs hardness scale; and those having a relatively low hardness, e.g., a hardness of less than or equal to 3 on the Mohs hardness scale. In an embodiment, a relatively hard coating is a Ti(C,N) coating, which has an estimated indentation hardness of around 2500 Vickers.

Characteristics other than hardness regarding abrasive effect may be pertinent. In an embodiment, graphite (e.g., used as a pore former in a ceramic-forming mixture) is an abrasive particle because it significantly or detectably or measurably contributes to wear of a die surface even though most graphites have a hardness of below 2 on the Mohs scale. For example, instead of hardness, the morphology and fracture behavior of graphite can enable graphite particles to assist in abrasion of a die surface.

For the purposes of designing abrasive flow media herein, in one or more embodiments, the components of the ceramic-forming mixtures having the highest and/or second highest and/or third highest abrasive effect, e.g., hardness, are of interest. That is, upon a review of the components of the ceramic-forming mixtures and their abrasive effects (e.g., hardness and/or experimentally measured wear rate) with respect to a die surface, the components can be ranked from most abrasive to least abrasive (e.g., hardest to softest) and those components that rank the highest, and/or second highest, and/or third highest, can be used with respect to composition, hardness, and/or overall particle morphology for choosing the characteristics of the abrasive grit particles. For example, the components of the ceramic-forming mixture, or materials having comparable physical properties, suitable for the abrasive flow media may have the greatest, second greatest, third greatest, etc. abrasive effect on the die surfaces. In this way, the abrasive flow media can be tailored in light of the composition of the both die surface (e.g., raw metal or coating) and the ceramic-forming mixture.

According to an embodiment, the abrasive flow media comprises abrasive grit particles and a flowable carrier. The abrasive flow media can be more abrasive than the ceramic-forming mixture (e.g., the AFM in some embodiments comprises abrasive particles that have a hardness at least as hard as the hardest and/or second hardest particle in the ceramic-forming mixture). As discussed herein, the abrasive grit particles can be designed to correspond to characteristics of the ceramic-forming mixture. The flowable carrier can be designed for providing long-term storage stability of the abrasive grit particles, e.g., to enable a long shelf-life and/or reusability for the abrasive flow media. As discussed herein, the combination of the abrasive grit particles and flowable carrier can be used to aid in matching the rheological flow of the media to the ceramic-forming mixture.

In an embodiment, the abrasive grit particles comprise a component of the ceramic-forming mixture having the highest and/or second highest hardness of the components of the ceramic-forming mixture. In an embodiment, the abrasive grit particles have a hardness that is is greater than or equal to a component of the ceramic-forming mixture having the highest and/or second highest hardness. In an embodiment, the abrasive grit particles comprise an abrasive particle having a hardness that is greater than or equal to a hardness of the surface of the die. In an embodiment, an overall volume weighted particle size distribution of the abrasive grit particles is substantially the same as an overall volume weighted particle size distribution of at least one of the highest and/or second highest hardness components of the ceramic-forming mixture (e.g., having a local maxima in the PSD that is less than 20%, or more preferably less than 10%, or even less than 5%, of a local maxima of abrasive particles in the ceramic-forming mixture). In an embodiment, the abrasive grit particles of the AFM comprise a maximum d99 particle diameter that is less than or equal to 80%, less than or equal to 75%, less than or equal to 70%, less than or equal to 50%, less than or equal to 30% of a smallest aperture dimension in the die (e.g., the slot width). The maximum d99 particle diameter can additionally be greater than or equal to 10% of a smallest aperture dimension in the die (e.g., the slot width).

The abrasive grit particles can include those compounds found in ceramic-forming mixtures. Exemplary abrasive grit particles include but are not limited to: inorganic batch materials, such as sources of alumina, titania, and silica.

Such suitable alumina sources include alpha-alumina, a transition alumina such as gamma-alumina or rho-alumina, hydrated alumina, gibbsite, corundum ($Al_2O_3$), boehmite (AlO(OH)), pseudoboehmite, aluminum hydroxide ($Al(OH)_3$), aluminum oxyhydroxide, or the like, and mixtures thereof.

Suitable titania sources include rutile, anatase, and amorphous titania.

Suitable silica sources include non-crystalline silica such as fused silica or sol-gel silica, silicone resin, low-alumina substantially alkali-free zeolite, diatomaceous silica, kaolin, and crystalline silica, such as quartz or cristobalite. Additionally, the silica-forming source can comprise a compound that forms free silica, when heated, for example, silicic acid or a silicon organometallic compound. The median particle size of the silica source is preferably less than 30 micrometers.

Other abrasive grit particles that may provide particle morphologies similar to components of the ceramic-forming mixtures include but are not limited to silicon carbide (SiC), silicon nitride ($Si_3N_4$), boron carbide ($B_4C$), cubic boron nitride (cBN), and diamond.

In addition to hardness, other properties of the abrasive grit can be alternatively or additionally considered, such as morphology, e.g., in comparison to the components of the ceramic-forming mixture. For example, in some embodiments the abrasive grit is formed from abrasive particles that have a specific morphology and/or fracture in a specific manner. In comparison to the morphology and/or manner of fracture of the abrasive particles of the ceramic-forming mixture, the fracture of the abrasive particles of the abrasive grit can be in same manner or a different manner, or along the same or different cleavage planes, when ground with other ingredients. In some embodiments, different abrasive grit particles are observed via optical or electron microscopy to characterize their particle morphologies and the abrasive grit particles are chosen to be similar to those of the ceramic-forming mixture.

In an embodiment, the abrasive grit particles comprise alumina, silica (quartz), or combinations thereof. In an embodiment, the abrasive grit particles comprise a bimodal particle size distribution (PSD), e.g., having a coarse particle size and a fine particle size. In a non-limiting embodiment, the PSD comprises a first mean particle diameter that is greater than or equal to 0.1 micrometer and less than or equal to 3 micrometers, and a second mean particle diameter that is greater than 3 micrometers and less than or equal to 100 micrometer, and all values and subranges therebetween.

In an embodiment, a system comprises: an abrasive flow media, a ceramic-forming mixture, and a honeycomb extrusion die having surfaces that will be exposed to the ceramic-forming mixture during extrusion, wherein the abrasive flow media is more abrasive than the ceramic-forming mixture. The abrasive flow media of system embodiments are in accordance with any abrasive flow media disclosed herein.

In an embodiment, the abrasive flow media comprises abrasive grit particles and a flowable carrier. In an embodiment, one or more of the following features is included: the abrasive grit particles comprise a highest or second highest hardness component of the ceramic-forming mixture; the abrasive grit particles have a hardness that is greater than or equal to the highest or second highest hardness component of the ceramic-forming mixture; an overall volume weighted particle size distribution of the abrasive grit particles being substantially the same as an overall volume weighted particle size distribution of the highest and second highest hardness components of the ceramic-forming mixture; the abrasive flow media has a rheological flow that is substantially the same as the ceramic-forming mixture; and/or the abrasive flow media comprises a maximum d99 particle diameter that is less than or equal to 80% and optionally greater than or equal to 10%, and all values and subranges therebetween, of a smallest aperture dimension in the die.

In some embodiments, the flowable carrier in the AFM is chosen at least in part for its stability, e.g., to give the AFM a long storage shelf life and/or to enable the AFM to be reused for breaking-in multiple dies. This is in contrast to ceramic-forming mixtures, which typically have an aqueous carrier system and can only be extruded once. A common flowable carrier mixture comprises: a silicone- or polyorganosiloxane-based medium. Aliphatic hydrocarbon lubricants, for example, non-volatile oils (such as mineral oils) and/or metallic greases can be added to further modify the rheological properties of the flowable carrier. The flowable carrier is preferably a visco-clastic material, displaying viscous-dominated behavior at low shear rates and transitioning to elastic-dominated behavior at high shear rates. This makes its flow behavior sensitive to shear rate (and therefore flow rate through a die). When combined with knowledge of the temperature sensitivity of the material of the flowable carrier, a wide range of rheological properties can be achieved by controlling the temperature and flow rate. Abrasive flow media can comprise carrier mixtures of siloxane polymers and aliphatic hydrocarbon lubricants filled with abrasive grits particles. In some embodiments, a hydroxy terminated dimethyl siloxane gum is utilized as a base material for the flowable carrier (e.g., and then further modified by oils and/or metallic greases as above). Such hydroxy terminated dimethyl siloxane gum materials are commercially available from Dow Chemical.

According to further embodiments, the abrasive flow media has a volumetric solids loading that is similar to a solids loading of the ceramic-forming mixture, such that the rheology of the AFM is sufficiently similar to that of the ceramic-forming mixture to generate desired wear on geometries and surfaces of the extrusion dies (e.g., as discussed with respect to FIGS. 2A-3B). In an embodiment, the abrasive grit comprises greater than or equal to about 25 vol. % to less than or equal to 55 vol. %, and all values and subranges therebetween, of the AFM, with the remainder of the AFM being comprised of the flowable carrier. In an embodiment, the abrasive flow media has a volumetric solids loading that is less than or equal to a volumetric solids loading of the ceramic-forming mixture. In an embodiment, the abrasive flow media has a volumetric solids loading that is greater than a volumetric solids loading of the ceramic-forming mixture.

In an embodiment, the abrasive flow media has a rheological flow that is substantially the same as the ceramic-forming mixture. For example, the rheological flow can be experimentally observed by flowing the abrasive flow media through a die or dielet and comparing the resulting surface pattern to a target surface pattern. Matching rheological flow characteristics of the AFM to those of the ceramic-forming mixture can facilitate generating representative directionality and morphology of flow pathways on the surfaces of die parts.

Rheological flow characteristics of the AFM and the ceramic-forming mixture can be determined by measurements on instruments such as parallel plate rheometers, capillary tube rheometers, or puck-compression tests using uniaxial compression testing machines. Attributes that contribute to rheological flow of the ceramic-forming mixture include: (1) yield strength at which the batch begins to shear and transitions from a visco-elastic material to a visco-plastic material, and (2) ratio of entry pressure to wall drag in a capillary tube rheometer test. The AFM can be formulated so as to match or substantially match these two attributes of the batch.

The AFM are designed to achieve wear patterns on conditioned surfaces of the dies. There are to be minimal differences between the wear patterns generated by the AFM and target surface patterns observed on broken-in surfaces of existing dies. Directionality and morphology as shown in FIGS. 3A-3B are relevant parameters of the of the target surface patterns generated by a particular ceramic-forming batch material.

One way to determine whether and when a candidate AFM achieves a wear pattern with minimal differences to a target surface pattern is experimentally. In a non-limiting embodiment, first, representative dielets are made having unconditioned surfaces (i.e., surfaces that have yet to be exposed to the ceramic-forming mixture during extrusion). The unconditioned surfaces can be formed by one or more wear-resistant coating such as Ti(C,N) or B—Ti(C,N) coatings, or as uncoated surfaces. Then, the unconditioned surfaces are exposed to candidate AFMs at varying flow rates and temperatures in off-line equipment such as abrasive flow machining equipment to form conditioned or worn dielets. At various intervals, pins from the conditioned dielets are compared with pins from a well-worn and broken-in die having a target surface pattern that has been shown to exhibit favorable flow immediately after mounting on an extruder.

Flow rate of the ceramic-forming mixture and of the AFM through the die is expected by the inventors to meaningfully influence the geometry of the wear patterns (e.g., surface roughness, groove-like flow patterns, etc.) formed on the exposed surfaces of the die. For this reason, the use of visco-elastic materials for the flowable carrier can be advantageous in some embodiments because these materials exhibit different properties when forced through a die under different pressures. In this way, the visco-elastic properties of the flowable carrier can be set or selected such that desirable flow rates (e.g., resembling or simulating the flow rates of the ceramic-forming mixture during the extrusion process) are obtained at different pressures. For example, in one embodiment the visco-elastic properties of the flowable carrier are set or selected such that a flow rate similar to a flow rate of the ceramic-forming mixtures is achieved but at a significantly lower pressure than the pressure required to extrude the ceramic-forming mixture. The influence of shear rate on whether a visco-elastic flowable carrier (e.g., a silicone- or polyorganosiloxane-based carrier) exhibits viscosity-dominated behavior or elasticity-dominated behavior can also be considered when using a visco-elastic carrier because the flow rate of the media through the orifices of a die can impact the degree of viscous relaxation (flow) vs. elastic compliance and subsequent springback that the media exhibits during the hole-to-slot transition.

Representative methods herein include methods of forming green honeycomb extrudates from ceramic-forming mixtures and methods of preparing honeycomb extrusion dies.

In an embodiment, a method of forming a green honeycomb extrudate from a ceramic-forming mixture comprises: exposing unconditioned surfaces of a honeycomb extrusion die to any abrasive flow media disclosed herein having a greater abrasive effect than the ceramic-forming mixture to prepare the honeycomb extrusion die with conditioned surfaces; and thereafter flowing the ceramic-forming mixture through the die over the conditioned surfaces to form the green honeycomb extrudate. The abrasive grit particles can comprise an abrasive component of the ceramic-forming mixture having an abrasive effect, preferably a significant or detectable or measurable abrasive effect. The abrasive grit particles can have a hardness that is greater than or equal to a component of the ceramic-forming mixture having a highest or second highest hardness. The abrasive flow media can have a volumetric solids loading that is less than or equal to a volumetric solids loading of the ceramic-forming mixture. The abrasive flow media can have a volumetric solids loading that is greater than a volumetric solids loading of the ceramic-forming mixture.

An embodiment provides that the unconditioned surfaces of the honeycomb extrusion die are uncoated surfaces, and the abrasive flow media is exposed to the uncoated surfaces for a duration that is effective: to change geometry of the uncoated surfaces, to deburr the uncoated surfaces, or combinations thereof. That is, methods herein can be used during intermediate die manufacturing steps, for example, before any coating is added. Surfaces of the metal die body can be prepared by exposing them to abrasive flow media in order to round edges and smooth prior to the addition of one or more coatings.

Another embodiment provides that the unconditioned surfaces of the honeycomb extrusion die are coated surfaces, and the abrasive flow media is exposed to the coated surfaces for a duration that is effective: to smooth the coated surfaces, to create flow grooves in the coated surfaces, or combinations thereof.

The unconditioned surfaces of the honeycomb extrusion die can be exposed to the abrasive flow media until a steady state media flow pressure is achieved, as an indication of when the surfaces have become conditioned. Another indication of when the surfaces have become conditioned that can be used independently or in conjunction with the flow pressure is formation of a wear pattern of the honeycomb extrusion die that has minimal differenced with respect to a target surface pattern.

Exposing the unconditioned surfaces of the honeycomb extrusion die to the abrasive flow media can be conducted in equipment off-line from a manufacturing extrusion line. In some embodiments, the honeycomb extrusion die with the conditioned surfaces is installed in a manufacturing extrusion line prior to flowing the ceramic-forming mixture through the die over the conditioned surfaces.

In an embodiment, a method of preparation of a honeycomb extrusion die that extrudes a ceramic-forming mixture into a green honeycomb extrudate comprises: designing an abrasive flow media to be more abrasive than the ceramic-forming mixture, the abrasive flow media comprising abrasive grit particles and a flowable carrier; and exposing unconditioned surfaces of the honeycomb extrusion die to the abrasive flow media to prepare the honeycomb extrusion die with conditioned surfaces.

In an embodiment, designing of the abrasive flow media comprises: identifying one or more components of the ceramic-forming mixture having a significant or detectable or measurable abrasive effect on the surfaces of a die; determining an overall particle size distribution (PSD) of the one or more components of the ceramic-forming mixture having a significant or detectable or measurable abrasive effect; determining a smallest aperture of the honeycomb extrusion die; obtaining abrasive grit particles comprising: the one or more components of the ceramic-forming mixture having a significant or detectable or measurable abrasive effect and/or a component not present in the ceramic-forming mixture having an abrasive effect that is greater than or equal to one or more components of the ceramic-forming mixture having a significant or detectable or measurable abrasive effect; the overall PSD of the one or more components of the ceramic-forming mixture having a significant or detectable or measurable abrasive effect; and mixing the abrasive grit particles with the carrier to form a mixture comprising a volumetric solids loading that is less than or equal to the volumetric solids loading of the ceramic-forming mixture; and optionally adjusting rheological flow characteristics of the mixture to match those of the ceramic-forming mixture to form the abrasive flow media.

In an embodiment, designing of the abrasive flow media comprises: identifying hardest and second hardest components of the ceramic-forming mixture and a volumetric solids loading of the ceramic-forming mixture. An overall particle size distribution (PSD) of the hardest and/or second hardest components of the ceramic-forming mixture is determined. A smallest aperture of the honeycomb extrusion die is also determined. Abrasive grit particles are obtained, which comprise: the highest and/or second highest hardness components of the ceramic-forming mixture and/or a component not present in the ceramic-forming mixture having a hardness that is greater than or equal to highest and/or second highest hardness components of the ceramic-forming mixture; the overall PSD of the hardest and/or second hardest components of the ceramic-forming mixture; and a maximum particle size that is less than or equal to 80% of the smallest opening of the honeycomb extrusion die. The abrasive grit particles are mixed with the flowable carrier to form a mixture comprising a volumetric solids loading that is less than or equal to the volumetric solids loading of the ceramic-forming mixture. Optionally, rheological flow characteristics of the mixture are adjusted to match those of the ceramic-forming mixture to form the abrasive flow media. The abrasive grit particles can comprise a highest or second highest abrasive effect component of the ceramic-forming mixture. The abrasive grit particles can have a hardness that is greater than or equal to a highest or second highest hardness component of the ceramic-forming mixture. An overall volume weighted particle size distribution of the abrasive grit particles can be substantially the same as an overall volume weighted particle size distribution of highest and/or second highest hardness components of the ceramic-forming mixture. The abrasive flow media can have a rheological flow that is substantially the same as the ceramic-forming mixture. The abrasive grit particles comprise a maximum d99 particle diameter that is less than or equal to 80% of a smallest aperture dimension in the die.

In an embodiment, the preparation method further comprises analyzing a broken-in surface of a comparable honeycomb extrusion die that extrudes the same ceramic-forming mixture to establish a target surface pattern, exposing the unconditioned surfaces of the honeycomb extrusion to the abrasive flow media to form conditioned surfaces that minimize differences between a wear pattern of the honeycomb extrusion die and the target surface pattern.

An embodiment provides that during the preparation method, the unconditioned surfaces of the honeycomb extrusion die are uncoated surfaces, and the abrasive flow media is exposed to the uncoated surfaces for a duration that is effective: to change geometry of the uncoated surfaces, to deburr the uncoated surfaces, or combinations thereof. In an embodiment, the method further comprises coating the uncoated surfaces after the duration to form coated surfaces, and subsequently exposing the abrasive flow media to the coated surfaces for a duration that is effective: to smooth the coated surfaces, to create flow grooves in the coated surfaces, or combinations thereof.

Another embodiment provides that during the preparation method, the unconditioned surfaces of the honeycomb extrusion die are coated surfaces, and the abrasive flow media is exposed to the coated surfaces for a duration that is effective: to smooth the coated surfaces, to create flow grooves in the coated surfaces, or combinations thereof.

In an embodiment, the coated surfaces of the honeycomb extrusion die comprise a coating of titanium carbonitride or of boron-doped titanium carbonitride.

In an embodiment, exposing the unconditioned surfaces of the honeycomb extrusion die to the abrasive flow media is conducted in equipment off-line from a manufacturing extrusion line.

EXAMPLES

Embodiments will be further clarified by the following example.

Example 1

The following example describes how to implement an embodiment of the present invention.

A ceramic-forming mixture "CFM1" is made on a die (D1) that makes 600/3 substrates (600 cells per square inch and 3 mil wall thickness).

The target slot width for the die D1 is approximately 0.00391 inches or 99.3 μm.

CFM1 has the ingredients of Table 1 with corresponding hardnesses according to the Mohs hardness scale.

TABLE 1

| CFM1 | |
|---|---|
| Ingredient | Mohs Hardness |
| Talc ($Mg_3Si_4O_{10}(OH)_2$) | 1 |
| Clay A ($Al_2Si_2O_5(OH)_4$) | <3 |
| Clay B ($Al_2Si_2O_5(OH)_4$) | <3 |
| Alumina A ($Al_2O_3$) | 9 |

TABLE 1-continued

| CFM1 | |
|---|---|
| Ingredient | Mohs Hardness |
| Alumina B ($Al_2O_3$) | 9 |
| Quartz ($SiO_2$) | 7 |

The talc and clays comprise the majority of the material but are generally considered to be soft, at less than 3 on the Mohs scale of hardness. Quartz defines a hardness of 7 on the Mohs scale and alumina defines a hardness of 9, so these ingredients are suspected to contribute the vast majority of the abrasive effect on a die surface. Both alumina powders and the silica powder combined for approximately 26.0 vol. % of the solid content of the material, or about 13.2 vol. % of the overall CFM1 composition when liquids are included.

Figure 4:
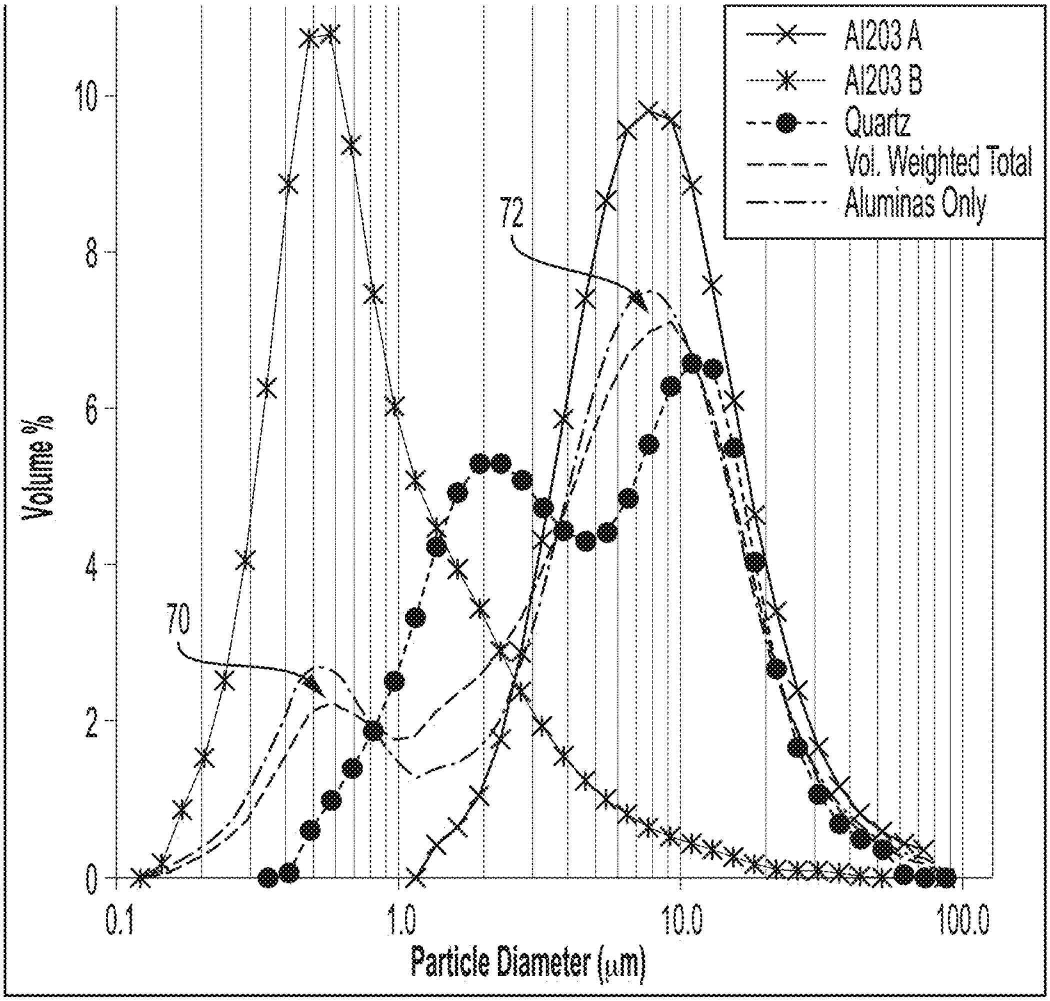
FIG. 4 is a graph of particle size distribution (PSD) in volume % versus particle diameter (micrometers).

FIG. 4 is a graph of volume % versus particle diameter (micrometers) for the hardest and second hardest components of CFM1 (alumina and quartz) along with a volume weighted total particle size distribution (PSD) and the PSD of the aluminas only. Individual PSDs in FIG. 4 were measured by a laser scattering-based particle size analysis instrument available from Microtrac, Inc., with the volume percentages reported according to the channels of the analysis instrument. The volume-weighted cumulative PSD of FIG. 4 represents the overall size distribution of particles in CFM1 that are understood to provide a meaningful abrasive effect during break-in (e.g., with Talc, Clay A, and Clay B being too soft to have an appreciable abrasive effect).

In FIG. 4, the particle size distribution (PSD) of Alumina B, which is <5 vol. % of the solid content of CFM1, peaks in volume % near 0.5 μm with a maximum of about 50 μm. The PSD of Alumina A, which is <15 vol. % of the solid content of CFM1, peaks in volume % near 8 μm with a maximum of about 74 μm. The PSD of the quartz, which is <7 vol. % of the solid content of CFM1, is bimodal with a first peak in volume % near 2 μm and a second peak near 11 μm, and having a maximum that tails off at about 74 μm. For this example, as shown in FIG. 4, the cumulative PSD (volume weighted total) of the most abrasive and second most abrasive ingredients of CFM1 is roughly bimodal, as shown by the solid black line in FIG. 4.

The following is used to design an abrasive flow media (e.g., AFM1) to condition of D1 die for CFM1. The overall volume weighted particle size distribution (PSD) of AFM1 can simulate one or more characteristics of the abrasive particles of CFM1. According to the embodiments disclosed herein, the overall particle size distribution (PSD) of AFM1 can include one or more peaks (in volume or weight %) that correspond to the peaks of the bimodal PSD for the CFM1 for various particle sizes. Such "peaks", as referred to herein, can be mathematically determined as local maxima in the volume % data for the PSD of a material. For example, the PSD of AFM1 in this example can be substantially the same as the bimodal PSD of the abrasive particles of CFM1 (solid black line in FIG. 4) with a peak or local maxima 70 in the volume % corresponding to a particle size of about 0.6 μm, a peak or local maxima 72 in the volume % corresponding to a particle size of about 9 μm, a minimum particle size of ~0.1 μm, and/or a maximum d99 particle size of not greater than 74 μm.

A bimodal distribution is expected to be effective to both grind (with the larger or coarser particles) and polish (with the smaller or finer particles). However, in some embodiments, the AFM is created such that it matches the PSD of only one of the hardest abrasive particles in the ceramic-forming mixture (e.g., just the Quartz of CFM1, just the Al2O3 A of CFM1, etc.) and/or a combination of abrasive particles of the ceramic forming mixture that does not result in a bimodal distribution, such as a monomodal distribution or a polymodal distribution.

In some embodiments, only a subset of a total number of peaks (local maxima) in a polymodal PSD for one or more abrasive particles of the ceramic-forming mixture is simulated by the AFM, such as only a subset of peaks determined or estimated to have a desired abrasive effect. For example, for a ceramic-forming mixture having multiple peaks in its PSD for the abrasive particles in the ceramic-forming mixture, an AFM can be created to simulate the peak(s) having the greatest amplitude (that is, the particle size corresponding to the largest volume %), the largest particle size (that is, the coarsest particles), etc. That is, it is generally expected that the abrasive particles in the ceramic forming material that are present in the highest volume percentage will have a greater effect on the abrasive effect and rheological flow behaviour of the ceramic-forming mixture, and that coarser particles will similarly have a greater abrasive effect than finer particles. In this way, by concentrating on only those properties of the PSD understood or experimentally determined to have the largest effect, an AFM can be more efficiently created while still suitably simulating the rheological flow characteristics and/or abrasive effect of ceramic-forming mixture. In some embodiments, the AFM is created with a PSD that simulates each peak in the PSD of the ceramic-forming mixture that corresponds to a volume % above a certain threshold (e.g., greater than about 2%) and/or that does not simulate any peaks that have a volume % less than a certain threshold (e.g., less than about 1%). In some embodiments, the limit of maximum $d_{99}$ particle size follows a stipulation that grit particles in the AFM are less than or equal to 70-80% of the smallest aperture in the extrusion die (such as the width of the slots in the extrusion die).

To prepare an AFM, such as AFM1 accordingly, different commercially available mesh abrasive grits for materials having the same or higher hardness than quartz and/or alumina for AFM1 (and/or the hardest, two hardest, three hardest, etc. components in other ceramic-forming mixtures) are mixed in specific volumetric ratios. With respect to AFM1 in one embodiment, the abrasive grit is formed as a mixture of 1-3 vol. % 400 mesh, 5-15 vol. % 600 mesh, 5-15 vol. % 800 mesh, 50-70 vol. % 1000 mesh, and 10-30 vol. % 8000 mesh to create a PSD having peaks simulating the bimodal PSD of CFM1. It is to be appreciated that other abrasive grit sizes and ratios can be utilized depending on the measured PSDs of other ceramic-forming mixtures and the particle size distributions of available abrasive grits. Alternatively, an AFM such as AFM1 can be prepared by grinding or milling a combination of abrasive powder via a method that generates the desired PSD, by using some of the ingredients of the ceramic-forming mixture as abrasive grit in the AFM (e.g., alumina, silica, etc.), purchasing individual abrasive grits that match the different ingredients in the ceramic batch and mixing them in similar ratios, or by other methods.

According to embodiments disclosed herein, once the abrasive grit particles are combined to have a PSD that simulates one or more peaks and/or is substantially the same as the PSD of the ceramic-forming mixture (e.g., CFM1), a solids loading is determined in a suitable carrier to simulate and/or achieve substantially the same rheological flow characteristics as the ceramic flow-material (e.g., CFM1).

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of conditioning a honeycomb extrusion die that extrudes a ceramic-forming mixture into a green honeycomb extrudate, the method comprising:

identifying at least one type of inorganic ceramic-forming particles in the ceramic-forming mixture that have an abrasive effect on the honeycomb extrusion die during extrusion;

mixing abrasive grit particles in a flowable carrier to form an abrasive flow media, wherein a particle size distribution of the abrasive grit particles corresponds to a particle size distribution of the at least one type of inorganic ceramic-forming particles in the ceramic-forming mixture, the at least one type of inorganic ceramic-forming particles comprising first abrasive particles comprising a first particle size distribution comprising a first peak in a volume percentage of the first abrasive particles at a first particle diameter and second abrasive particles comprising a second particle size distribution comprising a second peak in a volume percentage of the second abrasive particles at a second particle diameter, and the volume percentage of the second abrasive particles at the second peak of the second particle size distribution is within about 20% of the volume percentage of the first abrasive particles at the first peak of the first particle size distribution; and exposing unconditioned surfaces of the honeycomb extrusion die to the abrasive flow media to condition the unconditioned surfaces of the honeycomb extrusion die.

2. The method of claim 1, further comprising:

determining a smallest aperture of the honeycomb extrusion die; and wherein the abrasive grit particles comprise the at least one type of inorganic ceramic-forming particles in the ceramic-forming mixture identified as having the abrasive effect, or a component not present in the ceramic-forming mixture that is at least as abrasive as the at least one type of inorganic ceramic-forming particles in the ceramic-forming mixture identified as having the abrasive effect, and a maximum particle size of the abrasive grit particles is less than or equal to 80% of the smallest aperture of the honeycomb extrusion die.

3. The method of claim 1, wherein the abrasive flow media comprises a volumetric solids loading less than or equal to a volumetric solids loading of the ceramic-forming mixture.

4. The method of claim 1, further comprising adjusting a rheological flow characteristic of the abrasive flow media to match a rheological flow characteristic of the ceramic-forming mixture.

5. The method of claim 1, wherein the abrasive grit particles comprise a same composition as the at least one type of inorganic ceramic-forming particles in the ceramic-forming mixture.

6. The method of claim 1, wherein a hardness of the abrasive grit particles is greater than or equal to a highest or second highest hardness of the at least one type of inorganic ceramic-forming particles in the ceramic-forming mixture.

7. The method of claim 1, wherein an overall volume weighted particle size distribution of the abrasive grit particles is substantially the same as an overall volume weighted particle size distribution of a hardest component or a second hardest component of the ceramic-forming mixture.

8. The method of claim 1, wherein a rheological flow of the abrasive flow media is substantially the same as a rheological flow of the ceramic-forming mixture.

9. The method of claim 1, wherein a maximum $d_{99}$ particle diameter of the abrasive grit particles is less than or equal to 80% of a smallest aperture dimension in the honeycomb extrusion die.

10. The method of claim 1, wherein the unconditioned surfaces of the honeycomb extrusion die are uncoated surfaces, and the uncoated surfaces are exposed to the abrasive flow media for a first duration effective to change a geometry of the uncoated surfaces, to deburr the uncoated surfaces, or combinations thereof.

11. The method of claim 10, further comprising coating the uncoated surfaces after the first duration to form coated surfaces and exposing the coated surfaces to the abrasive flow media for a second duration effective to smooth the coated surfaces, to create flow grooves in the coated surfaces, or combinations thereof.

12. The method of claim 1, wherein the unconditioned surfaces of the honeycomb extrusion die are coated surfaces, and the coated surfaces are exposed to the abrasive flow media for a duration effective to smooth the coated surfaces, to create flow grooves in the coated surfaces, or combinations thereof.

13. The method of claim 11, wherein the coated surfaces of the honeycomb extrusion die comprise a titanium carbonitride coating or a boron-doped titanium carbonitride coating.

14. The method of claim 1, wherein the exposing the unconditioned surfaces of the honeycomb extrusion die to the abrasive flow media is conducted in equipment off-line from a manufacturing extrusion line.

15. The method of claim 1, wherein the abrasive grit particles comprise alumina, quartz, or combinations thereof.

16. The method of claim 1, wherein the flowable carrier comprises a silicone- or polyorganosiloxane-based polymer.

17. The method of claim 1, wherein the first particle size distribution is a polymodal distribution comprising the first peak and a third peak corresponding to a third particle size.

18. The method of claim 17, wherein the second particle size distribution is a polymodal distribution comprising the second peak and a fourth peak at a fourth particle size, wherein the fourth particle size is within 20% of the third particle size.

19. The method of claim 17, wherein the first particle size of the first peak is a largest particle size corresponding to any peaks of the polymodal distribution.

20. The method of claim 17, wherein the volume percentage of the first peak is a largest volume percentage of any peaks of the polymodal distribution.

* * * * *